(12) United States Patent
Asai

(10) Patent No.: US 11,528,369 B2
(45) Date of Patent: Dec. 13, 2022

(54) TERMINAL DEVICE, NON-TRANSITORY COMPUTER READABLE STORAGE MEDIUM AND METHOD FOR TERMINAL DEVICE

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/452,849

(22) Filed: Oct. 29, 2021

(65) Prior Publication Data
US 2022/0141344 A1 May 5, 2022

(30) Foreign Application Priority Data
Oct. 30, 2020 (JP) .............................. JP2020-182537

(51) Int. Cl.
*H04N 1/00* (2006.01)
*G06F 3/12* (2006.01)
*G06Q 10/08* (2012.01)

(52) U.S. Cl.
CPC ....... *H04N 1/00344* (2013.01); *G06F 3/1219* (2013.01); *G06F 3/1231* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 2008/0244043 A1 | 10/2008 | Kawai | |
| 2016/0288515 A1* | 10/2016 | Matsuda | G06K 15/4075 |
| 2016/0292774 A1* | 10/2016 | Ohara | G06F 3/1229 |
| 2017/0063646 A1 | 3/2017 | Kawai | |
| 2017/0345080 A1* | 11/2017 | Asai | H04N 1/00413 |

FOREIGN PATENT DOCUMENTS

| | | |
|---|---|---|
| JP | 2008-250688 A | 10/2008 |
| JP | 2017-049767 A | 3/2017 |

* cited by examiner

*Primary Examiner* — Lennin R Rodriguezgonzalez
(74) *Attorney, Agent, or Firm* — Scully, Scott, Murphy & Presser, PC

(57) ABSTRACT

A terminal device may include: a controller configured to: search for one or more devices in the network; and execute a first changing process for changing a state of a memory configured capable of storing service information in association with identification information identifying a device, in which the first changing process includes a process for, in a situation where the memory stores specific service information in association with specific identification information identifying a specific device, storing the specific service information in association with target identification information in place of the specific identification information, the specific device is a device indicated by device information currently registered in the terminal device, and the target identification information is information identifying a target device from among the searched one or more devices.

19 Claims, 8 Drawing Sheets

TERMINAL DEVICE, NON-TRANSITORY COMPUTER READABLE STORAGE MEDIUM AND METHOD FOR TERMINAL DEVICE

CROSS-REFERENCE TO RELATED APPLICATION

This application claims priority to Japanese patent application No. 2020-182537, filed on Oct. 30, 2020, the entire contents of which are incorporated herein by reference.

TECHNICAL FIELD

The art disclosed herein relates to a shipping service of shipping a consumable article to be used in a device to a user.

BACKGROUND

A system that provides a shipping service of a cartridge to be mounted in a printer is known. The system includes a printer and an information management server. The information management server ships the cartridge to a user of the printer when a remaining amount of ink in a cartridge in the printer is below a threshold. The information management server stores shipping information including an address for example in association with a serial number of the printer.

SUMMARY

A situation in which an old printer is replaced with a new printer may be assumed. In such a situation, a user may possibly forget to conduct necessary procedures for receiving a shipping service with the new printer. In this case, a cartridge of the new printer may not be shipped, and the user may not be able to print with the new printer.

The present disclosure provides an art for suppressing an occurrence of a situation in which a target device cannot be used after using a particular device.

A terminal device disclosed herein may comprise: a communication interface configured for communication via a network; and a controller configured to: search for one or more devices in the network via the communication interface; and execute a first changing process for changing a state of a memory configured capable of storing service information in association with identification information identifying a device, wherein the service information is information for providing a shipping service, the shipping service is a service for shipping a consumable article to be used by the device to a user of the device in a case where an operating state of the device satisfies a specific condition, the first changing process includes a process for, in a situation where the memory stores specific service information in association with specific identification information identifying a specific device, storing the specific service information in association with target identification information in place of the specific identification information, the specific device is a device indicated by device information currently registered in the terminal device, and the target identification information is information identifying a target device from among the searched one or more devices.

A method disclosed herein may comprises a step for searching for one or more devices in the network via a communication interface of a terminal device; and a step for executing a first changing process for changing a state of a memory configured capable of storing service information in association with identification information identifying a device, wherein the service information is information for providing a shipping service, the shipping service is a service for shipping a consumable article to be used by the device to a user of the device in a case where an operating state of the device satisfies a specific condition, the first changing process includes a process for, in a situation where the memory stores specific service information in association with specific identification information identifying a specific device, storing the specific service information in association with target identification information in place of the specific identification information, the specific device is a device indicated by device information currently registered in the terminal device, and the target identification information is information identifying a target device from among the searched one or more devices.

A control method, a computer program, and a computer-readable recording medium storing the computer program for implementing the above terminal device are also novel and useful. A communication system comprising the above terminal device and another device (such as device) is also novel and useful.

BRIEF DESCRIPTION OF DRAWINGS

EMBODIMENT (Configuration of Communication System 2; FIG. 1)

As shown in FIG. 1, a communication system 2 comprises a terminal device 10, two multifunction peripherals 100, 200 (hereinafter "MFPs"), and a service providing server 300 (hereinafter "SP server"). The terminal device 10 is a terminal device such as a desktop PC, a laptop PC, tablet PC, smartphone, etc. The MFP 100 is a device configured to perform various functions such as print function, scan function, and/or facsimile function. The terminal device 10 and the MFP 100 are connected to a Local Area Network (LAN) 4. The LAN 4 may be wired LAN or wireless LAN. The SP server 300 can communicate with each of the devices 10, 100 via the Internet 6 and the LAN 4.

(Configuration of SP server 300)

Figure 1:
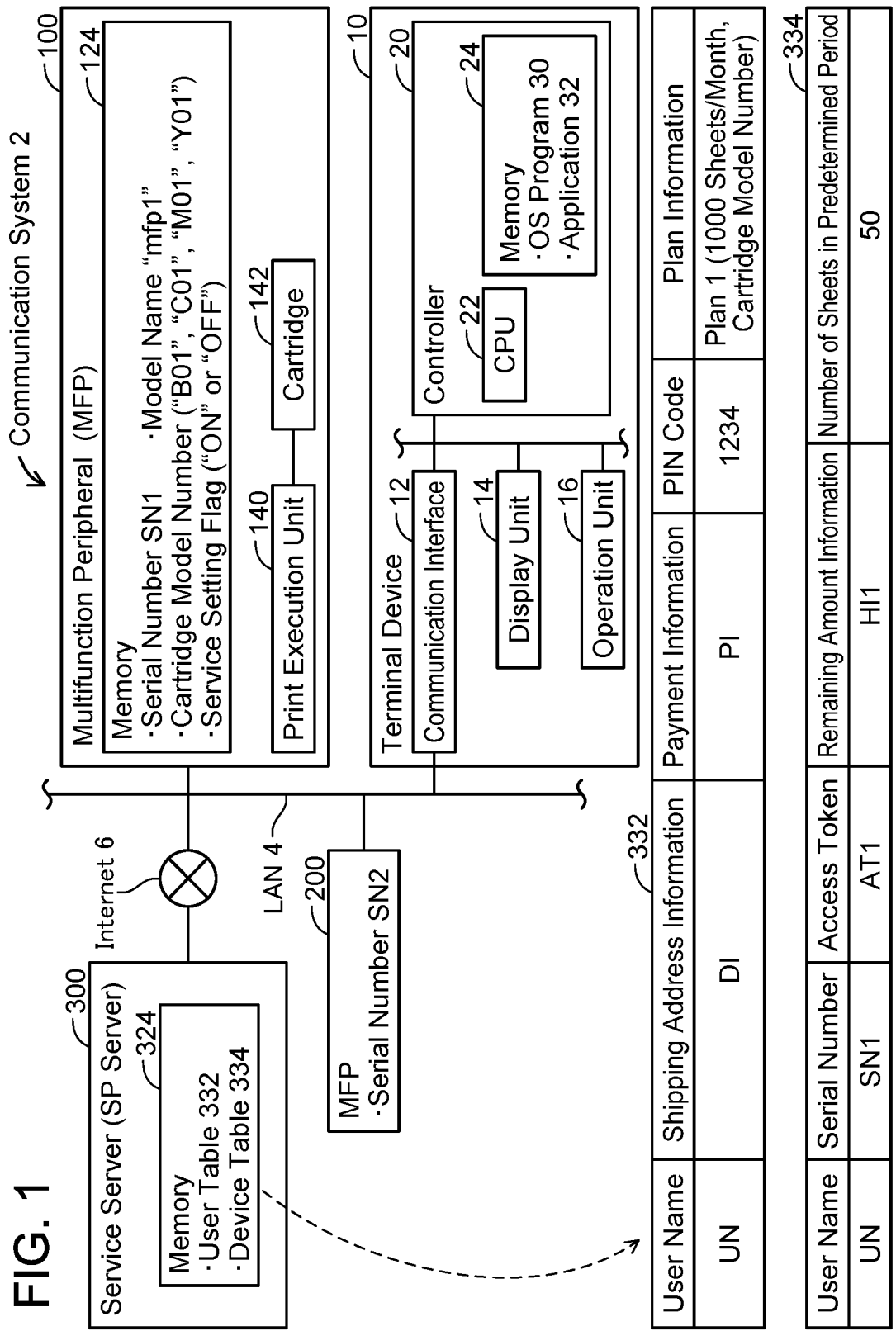
FIG. 1 illustrates a configuration of a communication system.

The SP server 300 is a server configured to provide a printing service related to a print function. The printing service comprises a shipping service of shipping color cartridge(s) mountable in a MFP (such as the MFP 100) and a management service of managing a number of sheets of print medium that is printed with a coloring material (e.g., ink, toner) stored in the color cartridge(s). Hereafter, a "cartridge" will be denoted "CTG". In the shipping service, the SP server 300 conducts a shipping process for shipping color CTG(s) (e.g., notifying a worker about a shipment thereof).

The management service manages a number of sheets of print medium that is printed in a specific period (e.g., one month) (the number of sheets herein will be referred to as "specific period number of sheets") reaching a specific contracted number of sheets (e.g., 1000 sheets). For example, a user pays a fixed fee for the specific period. The user can use the print function of the MFP 100 until the specific period number of sheets reaches the specific contracted number of sheets. When the specific period number of sheets exceeds the specific contracted number, the user can continue using the print function of the MFP 100 by paying an extra fee which is a number of sheets multiplied by a price per sheet (e.g., ten yen/sheet). In a variant, when the specific period number of sheets exceeds the specific contracted number, use of the print function of the MFP 100 may be prohibited.

The SP server 300 is arranged on the Internet 6 by a vendor of the MFP 100 for example. In a variant, the SP server 300 may be arranged on the Internet 6 by an entity different from this vendor.

The SP 300 comprises a memory 324 storing a user table 332 and a device table 334. The user table 332 stores one or more user information respectively corresponding to one or more users receiving the printing service. Each of the user information includes a user name (e.g., UN) for identifying a user, shipping address information (e.g., DI) indicating a shipping address of a color CTG (e.g., address of the user), and payment information (e.g., PI) indicating a payer of fees such as the fixed fee (e.g., credit card number of the user). Further, the user table 332 may store a Personal Identification Number (PIN) code (e.g., 1234) and plan information (e.g., "plan 1") in association with each user information. The PIN code is used for verification for storing a serial number of a printer in the device table 334. The plan information indicates contract particulars (i.e., contracted plan) of the printing service. The plan information includes a contracted number of sheets, a price of the fixed fee, and CTG model number(s) indicating color CTG(s) to be shipped by the shipping service, etc.

One or more device-related information are registered in the device table 334. Each of the one or more device-related information may comprise a user name (e.g., UN), a serial number (e.g., SN1), an access token (e.g., AT1), remaining amount history information (e.g., HI1), a number of sheets in a specific period, and shipping state information. The access token is authentication information used for communication between a MFP and the SP server 300. The remaining amount history information is information indicating a history of remaining amount(s) of color CTG(s) currently mounted in the MFP.

(Configurations of MFPs 100, 200)

The MFP 100 comprises a memory 124 and a print execution unit 140. Execution unit(s) (i.e., means) for executing function(s) (e.g., scan function) other than the print function are omitted in the drawings.

The memory 124 stores a serial number SN1 for identifying the MFP 100, a model name of the MFP 100 "mfp1", CTG model name(s) respectively indicating model name(s) of color CTG(s) 142 compatible with the MFP 100, and a service setting flag. The service setting flag indicates either "ON" indicating that supply of the printing service is enabled or "OFF" indicating that the supply of the printing service is disabled. The service setting flag indicates "OFF" as default. Because the MFP 100 stores the service setting flag, the MFP 100 is compatible with the supply of the printing service. Contrary to this, a MFP which does not store the service setting flag is not compatible with the supply of the printing service.

The CTG model name(s) in the memory 124 may include "B01", "C01", "M01", and "Y01". "B01" means the model name of a CTG containing black color material. Likewise, "C01", "M01", and "Y01" indicate the model names of CTGs containing cyan color, magenta color, and yellow color materials, respectively.

The print executing unit 140 comprises printing mechanism such as inkjet or laser. The color CTG(s) 142 may be mounted in the print executing unit 140. An IC chip (not illustrated) is provided on each of the color CTG(s) 142. Information in each of the IC chip(s) is read by the print executing unit 140 to verify mounting of its corresponding color CTG 142.

Figure 2:
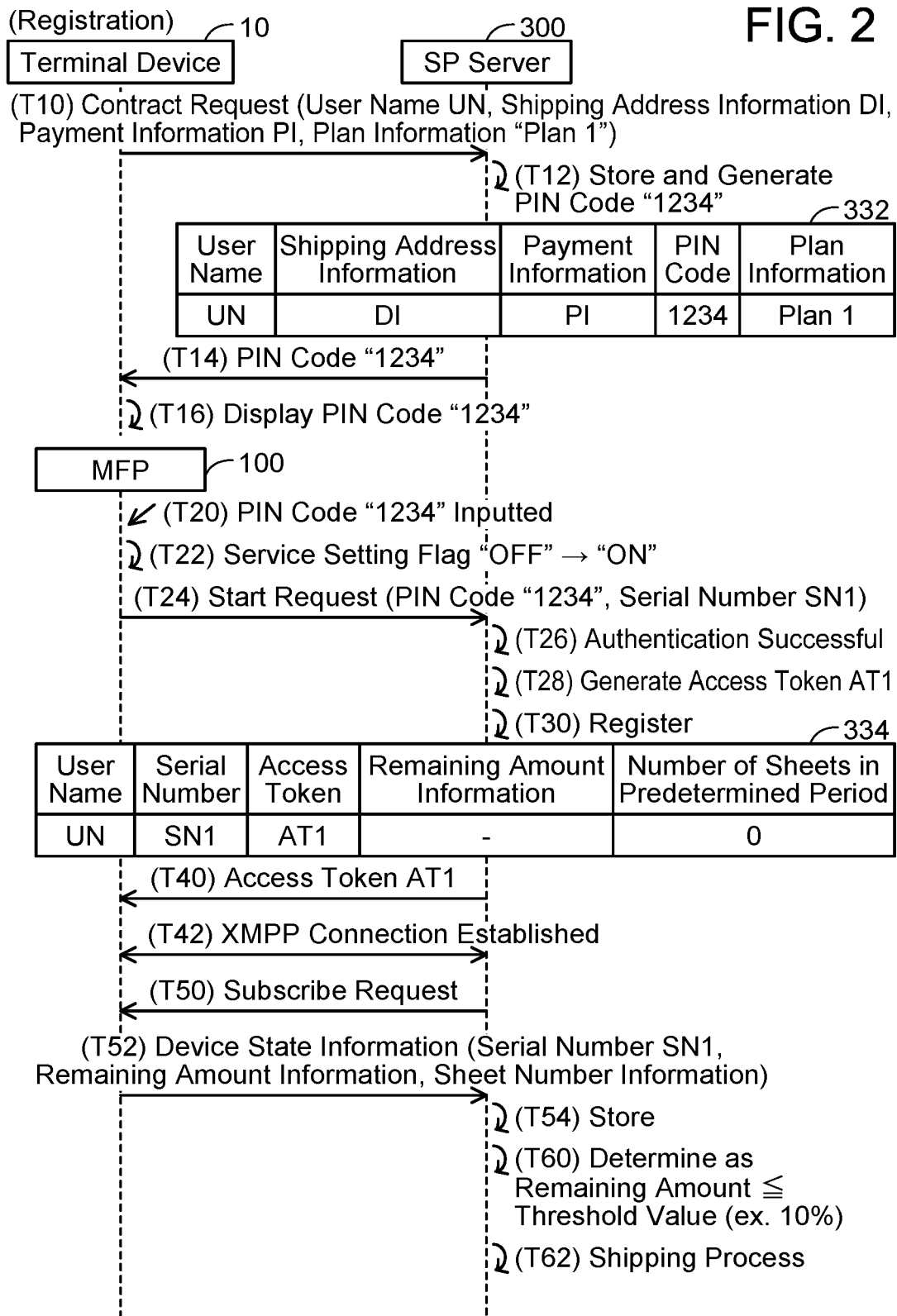
FIG. 2 illustrates a sequence diagram of a start of a service.

The present embodiment assumes a situation in which a user uses the MFP 100 and is receiving the printing service with the MFP 100. FIG. 2 to be described below indicates processes that are executed prior to receiving the printing service with the MFP 100. In the present embodiment, the MFP 200 is newly installed in such a situation. The MFP 200 is installed because the MFP 100 is aging and is to be replaced with the MFP 200, and/or the MFP 100 is replaced with the MFP 200 as a main MFP used primarily, for example. The MFP 200 stores a serial number SN2 for identifying the MFP 200.

(Configuration of Terminal Device 10)

The terminal device 10 comprises a communication interface 12, a display unit 14, an operation unit 16, and a controller 20. Each of the components 12 to 20 is connected to bus line (reference numeral omitted). An interface will be hereinafter referred to as "I/F".

The communication I/F 12 is an I/F for communication via the LAN 4 and is connected to the LAN 4. The display unit 14 is a display for displaying various types of information. The operation unit 16 comprises a plurality of keys. A user can input various instructions into the terminal device 10 by operating the operation unit 16. The display unit 14 also may function as a touch panel (i.e., as an operation unit) for receiving instructions from the user.

The controller 20 comprises a CPU 22 and a memory 24. The CPU 22 is configured to execute various processes in accordance with programs 30, 32 stored in the memory 24. The memory 24 is constituted of a volatile memory, a nonvolatile memory, and the like. The Operating System (OS) program 30 is a program for executing basic operations of the terminal device 10. The application program 32 (hereafter, "application 32") is a program for controlling the MFP 100. The application 32 is configured to execute processes related to the printing service (e.g., process for receiving the printing service).

(Start of Service; FIG. 2)

FIG. 2 illustrates a sequence diagram of the processes performed in advance for receiving the printing service with the MFP 100. Hereafter, for easier understanding, processes executed by the CPU of each device (e.g., the CPU 22 of the terminal device 10) may hereinafter be described with each device (e.g. the terminal device 10) as the subject of action, instead of describing each CPU as the subject of action. Further, the communication between the terminal device 10 and the MFP 100 is executed via the communication I/F 12 and the LAN 4, and communication between the terminal device 10 or the MFP 100 and the SP 300 is executed via the LAN 4 and the Internet 6. Hereafter, unless mentioned in particular, the descriptions "via the communication I/F 12", "via the LAN 4" and "via the Internet 6" will be omitted.

In an initial state of FIG. 2, the user name UN is registered in the user table 332 (see FIG. 1). The user name UN is registered in the SP server 300 by, for example, the user operating the terminal device 10.

When the terminal device 10 receives an instruction to activate the application 32 and a start instruction to start the printing service at the operation unit 16 from the user, the terminal device 10 sends a contract request to the SP server 300 by using the application 32 in T10. In a variant, the contract request may be sent by using a typical Web browser.

The start instruction includes inputs of the user name UN, the shipping address information DI, the payment information PI, and the plan information "plan 1". Here, the plan information "plan 1" is one of a plurality of plans available for the MFP 100, and the user selects the plan information "plan 1" from the plurality of plans. The contract request of T10 includes various information inputted as the start instruction.

When the SP server 300 receives the contract request from the terminal device 10 in T10, then in T12, the SP server 300 generates a PIN code "1234" and stores the PIN code "1234" and the other information in the contract request in the user table 332 in association with the user name UN in the contract request. In T14, the SP server 300 sends the PIN code "1234" to the terminal device 10.

When the terminal device 10 receives the PIN code "1234" from the SP server 300 in T14, the terminal device 10 displays the PIN code "1234" on the display unit 14 in T16. Due to this, the user can see the PIN code "1234".

When the MFP 100 receives the input of the PIN code "1234" from the user in T20, the MFP 100 shifts the service setting flag from "OFF" to "ON" in T22. Then, the MFP 100 sends a start request to the SP server 300 in T24. The start request is a command for requesting the start of the printing service, and includes the PIN code "1234" and the serial number SN1 of the MFP 100.

When the SP server 300 receives the start request from the MFP 100 in T24, then in T26, the SP server 300 verifies the PIN code "1234" included in the start request. In the present case, because the PIN code "1234" included in the start request matches the PIN code "1234" in the user table 332, the SP server 300 determines that the PIN code is successfully verified, and determines the user name UN stored in association with the PIN code "1234" as a targeted user name for the printing service. Subsequently, in T28, the SP server 300 generates an access token AT1.

In T30, the SP server 300 stores the user name UN, the serial number SN1 included in the start request, and the access token AT1 in association with each other in the device table 334. At present, the remaining amount history information is not stored in the device table 334 in association with the user name UN. Further, at present, the specific period number of sheets indicates zero.

In T40, the SP server 300 sends the access token AT1 to the MFP 100. Due to this, the MFP 100 stores the access token AT1 in the memory 124 of the MFP 100.

In T42, the MFP 100 establishes an eXtensible Messaging and Presence Protocol (XMPP) connection with the SP server 300 by using the access token AT1 in the memory 124. The XMPP connection is a so-called fulltime connection, and remains established until power source of the MFP 100 is turned off. The XMPP connection allows the SP server 300 to send a request to the MFP 100 beyond a fire wall of the LAN 4 to which the MFP 100 belongs, even if the SP server 300 does not receive a request from the MFP 100. A scheme for sending a request from the SP server 300 to the MFP 100 may not be the XMPP connection but may be another scheme. For example, a Hypertext Transfer Protocol Secure (HTTPS) connection may be established between the MFP 100 and the SP server 300.

When the SP server 300 has the XMPP connection with the MFP 100 established in T42, the SP server 300 sends a Subscribe request to the MFP 100 in T50. The Subscribe request requests device state information indicating a current status of the MFP 100 to be repeatedly sent to the SP server 300.

When the MFP 100 receives the Subscribe request from the SP server 300 in T50, the MFP 100 starts to send the device state information in accordance with the Subscribe request in T52. The device state information includes the serial number SN1, remaining amount information indicating the remaining amount(s) of the color CTG(s) 142 currently mounted in the MFP 100, and sheet number information indicating a number of sheets of a print medium printed in the MFP 100. The sheet number information is a total number of sheets of a print medium printed by the MFP 100 up to now from a first-time print after the shipment of the MFP 100.

When the SP server 300 receives the device state information from the MFP 100 in T52, then in T54, the SP server 300 stores the remaining amount information in the device state information as the remaining amount history information HI1 in the device table 334 in association with the serial number SN1 in the device state information. Further, the SP server 300 calculates the specific period number of sheets by using the sheet number information in the device state information, and stores the calculated specific period number of sheets in association with the serial number SN1 in the device table 334.

Figure 3:
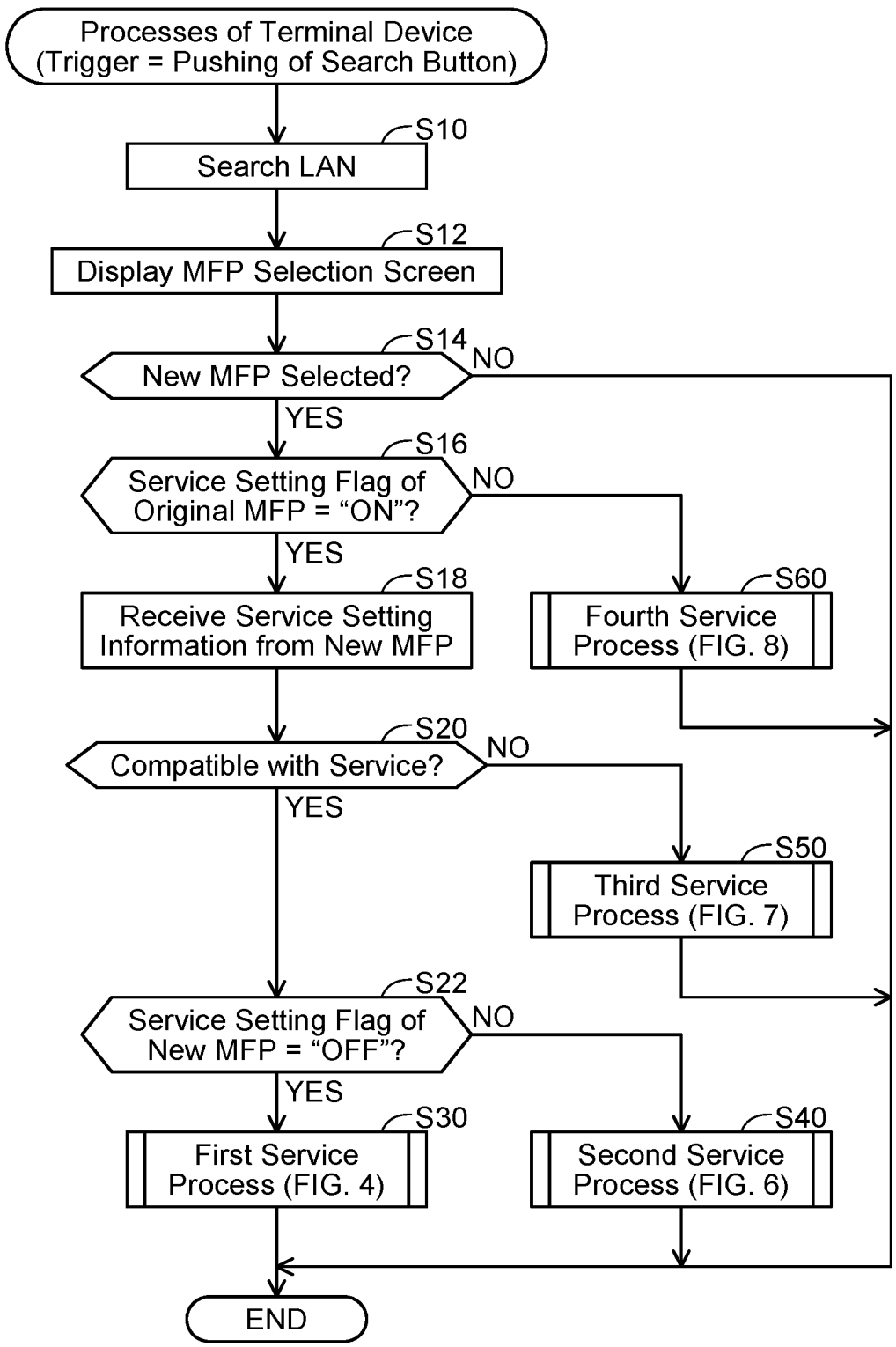
FIG. 3 illustrates a flowchart of processes in a terminal device.
Figure 5:
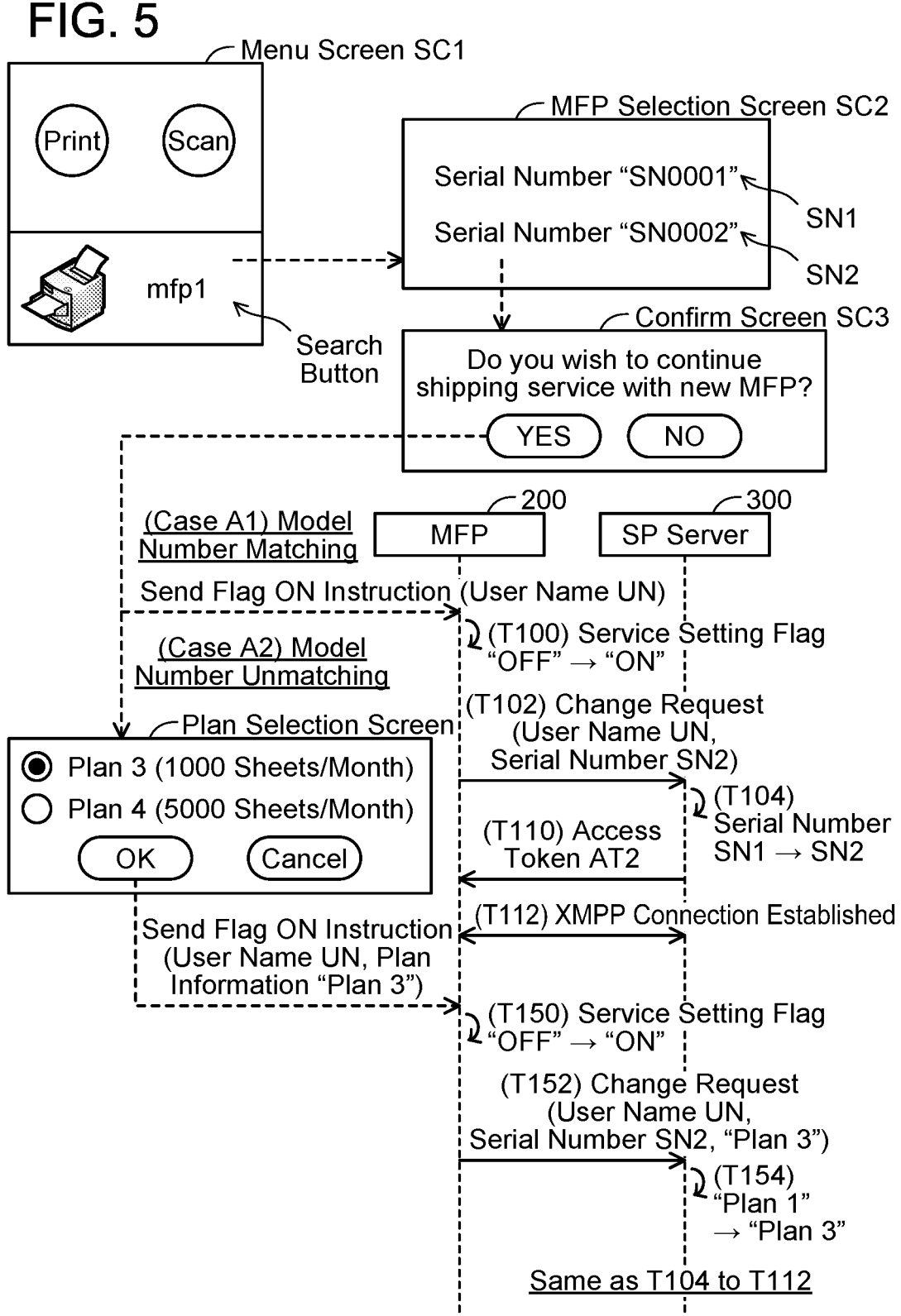
FIG. 5 illustrates respective screens and a sequence diagram of a specific case.

In T60, the SP server 300 identifies, at a periodic cycle (e.g., every one hour), whether a latest remaining amount indicated by latest remaining amount information in a history of the remaining amount history information HI1 is equal to or lower than a predetermined threshold (e.g., ten percent). In the present case, the SP server 300 determines that the latest remaining amount is equal to or lower than the threshold, and executes a shipment process in T62. The shipment process includes the SP server 300 obtaining the shipping address information DI and the plan information "plan 1" from the user table 332. Then, the SP server 300 notifies the worker that the color CTG(s) 142 indicated by the CTG model name(s) in the obtained plan information "plan 1" are to be shipped to the shipping address indicated by the obtained shipping address information DI. The condition under which the color CTG(s) 142 are to be shipped is not limited to the latest remaining amount being at the threshold or lower, but may be, for example, an amount of change in the remaining amount calculated based on the history of the remaining amount history information HI1 being a predetermined value or more, or a combination thereof (Processes by Terminal Device; FIG. 3, FIG. 5)

With reference to FIGS. 3 and 5, processes executed by the CPU 22 of the terminal device 10 in accordance with the application 32 will be described. The CPU 22 causes the display unit 14 to display a menu screen SC1 shown in FIG. 5 in response to receiving the instruction to activate the application 32 on the operation unit 16. The menu screen SC1 includes a "Print" button for sending a printing request requesting execution of the print function, a "Scan" button for sending a scanning request requesting execution of the scan function, and a search button. The search button is a button for searing for one or more MFPs connected to the LAN 4.

In the present embodiment, the MFP 100 is currently designated by the user as a recipient of the printing request and the scanning request. The terminal device 10 stores (i.e., registers) device information indicating the designated MFP 100 in the memory 24. The device information includes an IP address of the MFP 100, the model name "mfp1", the serial number SN1, etc. The model name "mfp1" of the MFP 100 is displayed on the search button. This allows the user to acknowledge that the MFP 100 is currently designated as a recipient of the printing request and the scanning request. Hereafter, the MFP 100 which is currently designated by the user will be denoted "original MFP 100".

The process of FIG. 3 is started in response to a trigger, which is the search button in the menu screen SC1 being selected.

In S10, the CPU 22 searches for one or more MFPs on the LAN 4. Specifically, the CPU 22 sends a predetermined search signal to the LAN 4 by broadcast. Then, the CPU 22 receives a response signal in response to the search signal from each of the one or more MFPs on the LAN 4. Each response signal includes the serial number of the MFP which sent that response signal.

In S12, the CPU 22 causes the display unit 14 to display a MFP selection screen SC2 shown in FIG. 5. The MFP selection screen SC2 is a screen for selecting one targeted MFP from among the one or more MFPs which were searched for in S10. For example, when two MFPs 100, 200 are connected to the LAN 4, the MFP selection screen SC2 includes two serial numbers SN1, SN2 corresponding to the two MFPs 100, 200 (see FIG. 5). The user can select a MFP to be replaced.

In subsequent S14, the CPU 22 determines whether the targeted MFP selected in the MFP selection screen SC2 is the new MFP 200 or not. In a case where the serial number selected in the MFP selection screen SC2 does not match the serial number in the device information which is currently registered in the terminal device 10 (i.e., registered serial number), the CPU 22 determines that the targeted MFP is the new MFP 200 (YES in S14), and proceeds to processes from S16 onward. Contrary to this, in a case where the serial number selected in the MFP selection screen SC2 matches the registered serial number, the CPU 22 determines that the targeted MFP is not the new MFP 200 (NO in S14), skips the processes from S16 onward, and terminates the process of FIG. 3.

In S16, the CPU 22 requests the original MFP 100 and receives the service setting flag from the original MFP 100. Then the CPU 22 determines whether the service setting flag of the original MFP 100 indicates "ON" or not. In a case where the service setting flag of the original MFP 100 indicates "ON" (YES in S16), the CPU 22 proceeds to S18. Here, the service setting flag of the original MFP 100 indicating "ON" means that the serial number SN1 of the original MFP 100 is stored in the device table 334 of the SP server 300, and that the user is receiving the printing service with the original MFP 100.

In S18, the CPU 22 sends a setting request for requesting service setting information indicating settings related to the printing service to the new MFP 200, and receives the service setting information from the new MFP 200. Here, in a case where the new MFP 200 is compatible with the supply of the printing service, the service setting information includes a value of the service setting flag (i.e., "ON" or "OFF"). Contrary to this, in a case where the new MFP 200 is not compatible with the supply of the printing service, the service setting information does not include the value of the service setting flag.

In subsequent S20, the CPU 22 determines whether or not the new MFP 200 is compatible with the supply of the printing service. In a case where the CPU 22 determines that the new MFP 200 is compatible with the supply of the printing service due to the service setting information received in S18 including the value of the service setting flag (YES in S20), the CPU 22 proceeds to a process of S22.

In S22, the CPU 22 determines whether the service setting flag in the service setting information indicates "OFF" or not. In a case where the CPU 22 determines that the service setting flag in the service setting information indicates "OFF" (YES in S22), the CPU 22 executes in S30 a first service process to be described below (see FIG. 4).

Further, in a case where the CPU 22 determines that the service setting flag in the service setting information indicates "ON" (NO in S22), the CPU 22 executes in S40 a second service process to be described below (see FIG. 6).

In a case where the CPU 22 determines that the new MFP 200 is not compatible with the supply of the printing service due to the service setting information received in S18 not including the value of the service setting flag (NO in S20), the CPU 22 executes in S50 a third service process to be described below (see FIG. 7).

Further, in a case where the CPU 22 determines that the service setting flag of the original MFP 100 indicates "OFF" (NO in S16), in S60 the CPU 22 executes a fourth service process to be described below (see FIG. 8). Here, the service setting flag of the original MFP 100 indicating "OFF" means that the serial number SN1 of the original MFP 100 is not stored in the device table 334 of the SP server 300 and thus the user is not receiving the printing service with the original MFP 100. Upon completion of any one of the processes of S30, S40, S50 and S60, the CPU 22 terminates the process of FIG. 3.

Figure 4:
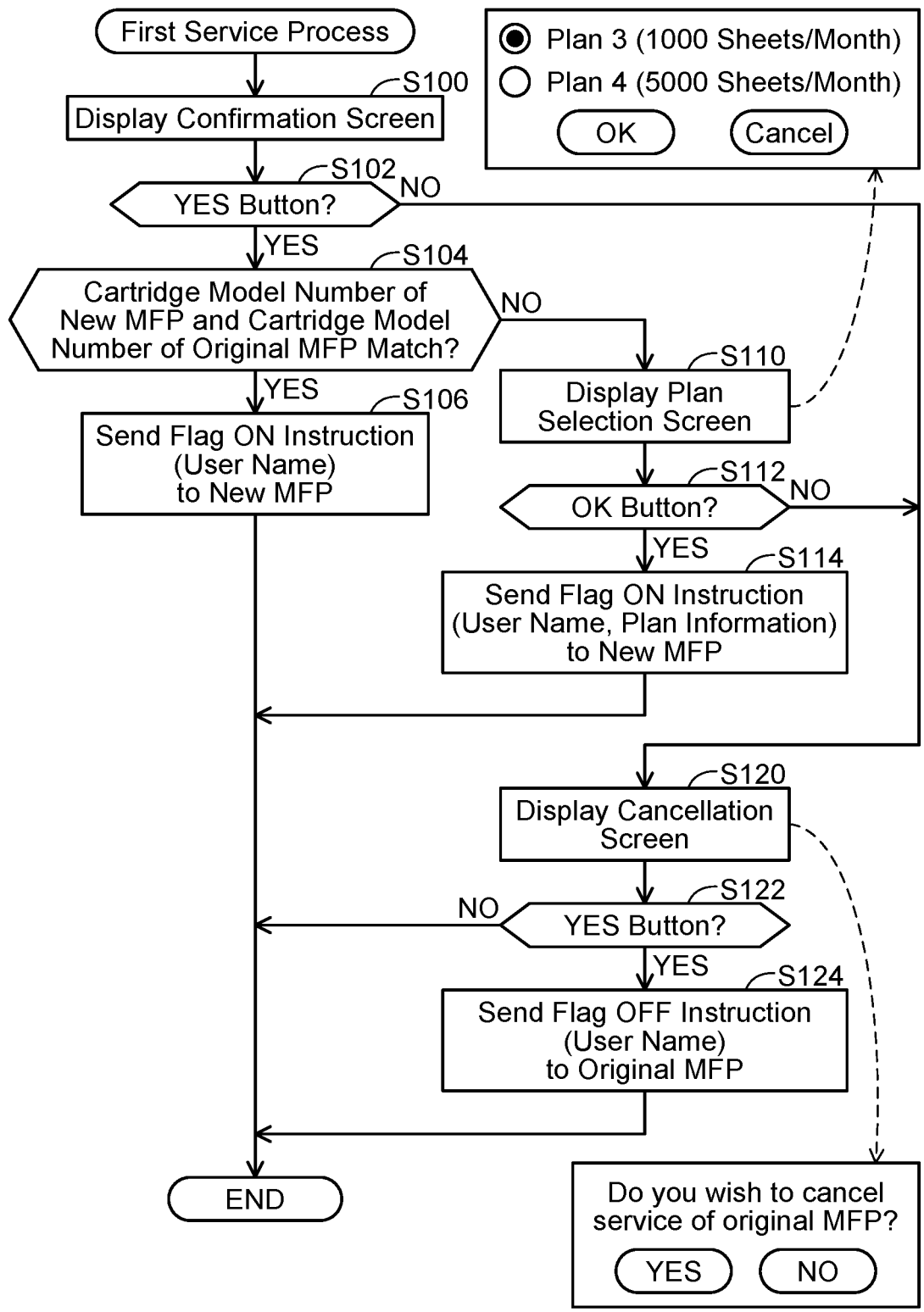
FIG. 4 illustrates a flowchart of a first service process.

(First Service Process; FIGS. 4, 5)

With reference to FIGS. 4, 5, the first service process in S30 of FIG. 3 will be described. In S100, the CPU 22 causes the display unit 14 to display a confirmation screen SC3 of FIG. 5. The confirmation screen SC3 includes a message that confirms whether the printing service (i.e. shipping service) is to be received with the new MFP 200 also, and YES and NO buttons.

In S102, the CPU 22 determines whether the "YES" button in the confirmation screen SC3 is selected. In a case where the CPU 22 determines that the "YES" button in the confirmation screen SC3 has been selected (YES in S102), the CPU 22 proceeds to S104.

In S104, the CPU 22 determines whether CTG model name(s) of color CTG(s) compatible with the new MFP 200 match the CTG model name(s) of the color CTG(s) compatible with the original MFP 100. The respective CTG model names of both the new MFP 200 and the original MFP 100 matching means that the shipping service of the same plan as that of the shipping service which was received with the original MFP 100 can also be received with the new MFP 200. In a case where the CPU 22 determines that the CTG model name(s) of the new MFP 200 match the CTG model name(s) of the original MFP 100 (YES in S104), the CPU 22 proceeds to S106. In a variant, in a case where a part of the CTG model name(s) of the new MFP 200 matches a part of the CTG model name(s) of the original MFP 100, the CPU 22 may proceed to S106. The part herein mentioned may be a character string at a first part of the CTG model name(s), for example.

The CTG model name(s) of the new MFP 200 to be used for the determination in S104 are included in the service setting information which was received from the new MFP

200 in S18 of FIG. 3. In a variant, the CTG model name(s) of the new MFP 200 may not be included in the service setting information. For example, the CPU 22 may receive the CTG model name(s) of the new MFP 200 from the new MFP 200 when the determination of S104 is performed. In a variant, the CPU 22 may receive the CTG model name(s) of the new MFP 200 from the SP server 300 by sending information related to the new MFP 200 (e.g., its model name) to the SP server 300. Further, the CTG model name(s) of the original MFP 100 used in the determination of S104 may be registered as the device information in the terminal device 10, or may be received from the original MFP 100 or the SP server 300 when the determination of S104 is performed.

In S106, the CPU 22 sends a flag ON instruction for changing the service setting flag of the new MFP 200 from "OFF" to "ON" to the new MFP 200. The flag ON instruction includes the user name UN. This makes the new MFP 200 change the service setting flag from "OFF" to "ON", and send the user name UN and the serial number SN2 of the new MFP 200 to the SP server 300. As a result of this, the printing service is started with the new MFP 200. Upon completion of the process of S106, the CPU 22 terminates the process of FIG. 4.

Further, in a case where the CPU 22 determines that the CTG model name(s) of the new MFP 200 do not match the CTG model name(s) of the original MFP 100 (NO in S104), the CPU 22 proceeds to S110. In S110, the CPU 22 causes the display unit 14 to display a plan selection screen. The plan selection screen includes radio buttons for selecting a specific plan from a plurality of plans available for the new MFP 200, an "OK" button, and a "Cancel" button. The respective CTG model names of both the original MFP 100 and the new MFP 200 not matching means that the shipping service of the same plan as that of the shipping service which was received with the original MFP 100 cannot be received with the new MFP 200. In the present embodiment, the user can select a plan available for the new MFP 200, and continue to receive the shipping service with the new MFP 200. Further, the user may choose not to receive the shipping service with the new MFP 200 considering the information on the plan selection screen.

In S112, the CPU 22 determines whether the "OK" button in the plan selection screen is selected or not. In a case where the CPU 22 determines that the "OK" button in the plan selection screen has been selected (YES in S112), the CPU 22 proceeds to S114.

S114 is the same as S106 except that the flag ON instruction includes plan information indicating a plan selected in the plan selection screen in addition to the user name UN and the serial number SN2 of the new MFP 200. In this case, the new MFP 200 sends the plan information in the flag ON instruction in addition to the user name UN and the serial number SN2 to the SP server 300. Upon completion of the process of S114, the CPU 22 terminates the process of FIG. 4.

Further, in a case where the CPU 22 determines that the "NO" button in the confirmation screen SC3 has been selected (NO in S102) and the "Cancel" button in the plan selection screen has been selected (NO in S112), the CPU 22 proceeds to S120. In S120, the CPU 22 causes the display unit 14 to display a cancellation screen. As shown in FIG. 4, the cancellation screen includes a message for confirming whether the printing service received with the original MFP 100 is to be cancelled or not, and "YES" and "NO" buttons.

In S122, the CPU 22 determines whether the "YES" button in the cancellation screen is selected or not. In a case where the CPU 22 determines that the "NO" button in the cancellation screen has been selected (NO in S122), the CPU 22 skips a process of S124 to be described below, and terminates the process of FIG. 4.

In a case where the CPU 22 determines that the "YES" button in the cancellation screen has been selected (YES in S122), the CPU 22 proceeds to S124. In S124, the CPU 22 sends a flag OFF instruction for changing the service setting flag of the original MFP 100 from "ON" to "OFF" to the original MFP 100. The flag OFF instruction includes the user name UN. This makes the original MFP 100 change the service setting flag from "ON" to "OFF", and sends a cancellation request including the user name UN to the SP server 300. As a result of this, the SP server 300 deletes the device-related information including the user name UN from the device table 334, and the printing service which was received with the original MFP 100 is cancelled. Upon completion of the process of S124, the CPU 22 terminates the process of FIG. 4. In a variant, the SP server 300 may not delete the device-related information including the user name UN from the device table 334. In this case, the SP server 30 may store a specific flag value indicating that the device-related information including the user name UN is enabled. Then, the SP server 300 may cancel the printing service which was received with the original MFP 100 by deleting the specific flag value.

(Specific Case; FIG. 5)

(Case A1) The present case is a case where it is determined in S104 of FIG. 4 that the CTG model name(s) of the new MFP 200 match the CTG model name(s) of the original MFP 100. In the present case, the terminal device 10 sends the flag ON instruction including the user name UN to the new MFP 200 (S106 of FIG. 4).

In T100, the MFP 200 changes the service setting flag from "OFF" to "ON" in response to receiving the flag ON instruction from the terminal device 10. Then, in T102, the MFP 200 sends a changing request for changing a state of the device table 334 to the SP server 300. The changing request includes the user name UN and the serial number SN2 of the MFP 200.

In the present case, the serial number SN1 of the original MFP 100 has been stored in the device table 334 in association with the user name UN. In response to receiving the changing request from the MFP 200 in T102, the SP server 300 stores the serial number SN2 in the changing request in place of the serial number SN1 in the device table 334 in T104. This allows each item (e.g., shipping address information DI) stored in association with the user name UN in the user table 332 to be associated with the serial number SN2.

In T110, the SP server 300 generates a new access token AT2, and stores the access token AT2 in association with the user name UN in the device table 334. Then, the SP server 300 sends the access token AT2 to the MFP 200. As a result of this, a XMPP connection is established between the MFP 200 and the SP server 300 and the printing service with the MFP 200 is started. In a variant, the SP server 300 may send the access token AT1 which was used with the original MFP 100 to the MFP 200.

There may be a situation in which the user forgets instructing to receive the printing service after installation of the MFP 200, for example, as a result of which the color CTG(s) are not shipped, thereby making it impossible for the user to print with the MFP 200. In the present case, the terminal device 10 searches for the MFP 200 on the LAN 4 (S10 of FIG. 3), and sends the flag ON instruction to the MFP 200. This allows the serial number SN2 of the new MFP 200 to be stored in place of the serial number SN1 of the original MFP 100, and each item in the user table 332 to be associated with the serial number SN2 (T104 of FIG. 5). Then, in a case where the device state information of the MFP 200 is sent to the SP server 300 and the remaining amount(s) of the color CTG(s) of the MFP 200 are determined as being at or less than the threshold, the color CTG(s) are shipped to the user of the MFP 200 (see T60, T62 of FIG. 2). That is, the shipping service which was provided to the original MFP 100 is also provided to the new MFP 200. Given the above, it is possible to prevent a situation in which the new MFP 200 cannot be used after use of the original MFP 100.

(Case A2)

The present case is a case in which it is determined in S104 of FIG. 4 that the CTG model name(s) of the new MFP 200 do not match the CTG model name(s) of the original MFP 100. In the present case, the user selects "plan 3" available for the new MFP 200 and selects the "OK" button in the plan selection screen. The terminal device 10 sends the flag ON instruction including the user name UN and the plan information "plan 3" to the new MFP 200 (S114 of FIG. 4). T150 is the same as T100. T152 is the same as T102 except that the changing request includes the plan information "plan 3". The plan information "plan 3" includes the CTG model name(s) of the MFP 200.

In the present case, the plan information "plan 1" indicating the plan available for the original MFP 100 is stored in association with the user name UN in the device table 334. In T154, the SP server 300 changes the plan information "plan 1" stored in association with the user name UN to the plan information "plan 3" in the changing request. Then, the same processes as T104 to T112 are performed.

According to the present case, the shipping service is provided to the new MFP 200, and the color CTG(s) compatible with the new MFP 200 are shipped by that shipping service. Even in a case where the new MFP 200 and the original MFP 100 use different compatible color CTGs, the shipping service which was provided to the original MFP 100 can be provided to the new MFP 200 as well.

(Second Service Process; FIG. 6)

Figure 6:
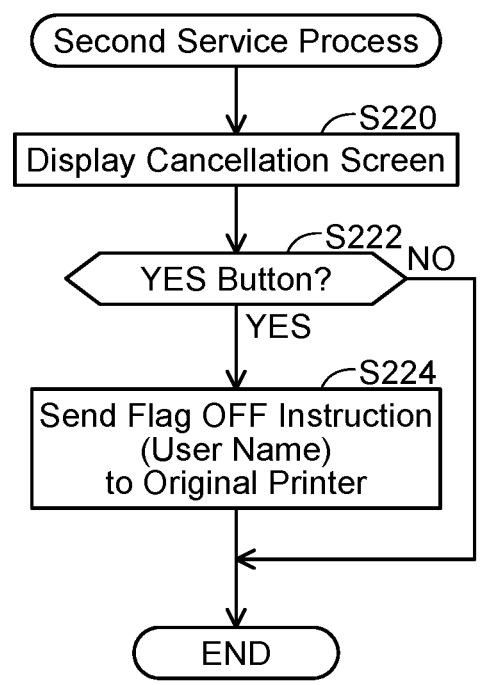
FIG. 6 illustrates a flowchart of a second service process.

With reference to FIG. 6, the second service process in S40 of FIG. 3 will be described. S220 to S224 are the same as S120 to S124 of FIG. 4. This allows the printing service that was received with the original MFP 100 to be cancelled. Upon completion of S220 to S224, the CPU 22 terminates the process of FIG. 6.

Execution of the second service process means that the service setting flag in the new MFP 200 indicates "ON". That is, the serial number SN2 of the new MFP 200 is already stored in the device table 334, and the user is already receiving the printing service with the new MFP 200. Under a situation where the user is already receiving the printing service with the new MFP 200, the user may possibly not need the printing service being received with the original MFP 100. By executing the second service process, the user can be encouraged to cancel the printing service the user does not need anymore.

Further, in the present embodiment, in the case where the service setting flag in the new MFP 200 indicates "ON" (NO in S22 of FIG. 3), the first service process is not performed but the second service process is performed. That is, under the situation where the user is already receiving the printing service with the new MFP 200, the unnecessary first service process (being sending of the flag ON instruction) is not performed. Execution of unnecessary process can be reduced.

(Third Service Process; FIG. 7)

Figure 7:
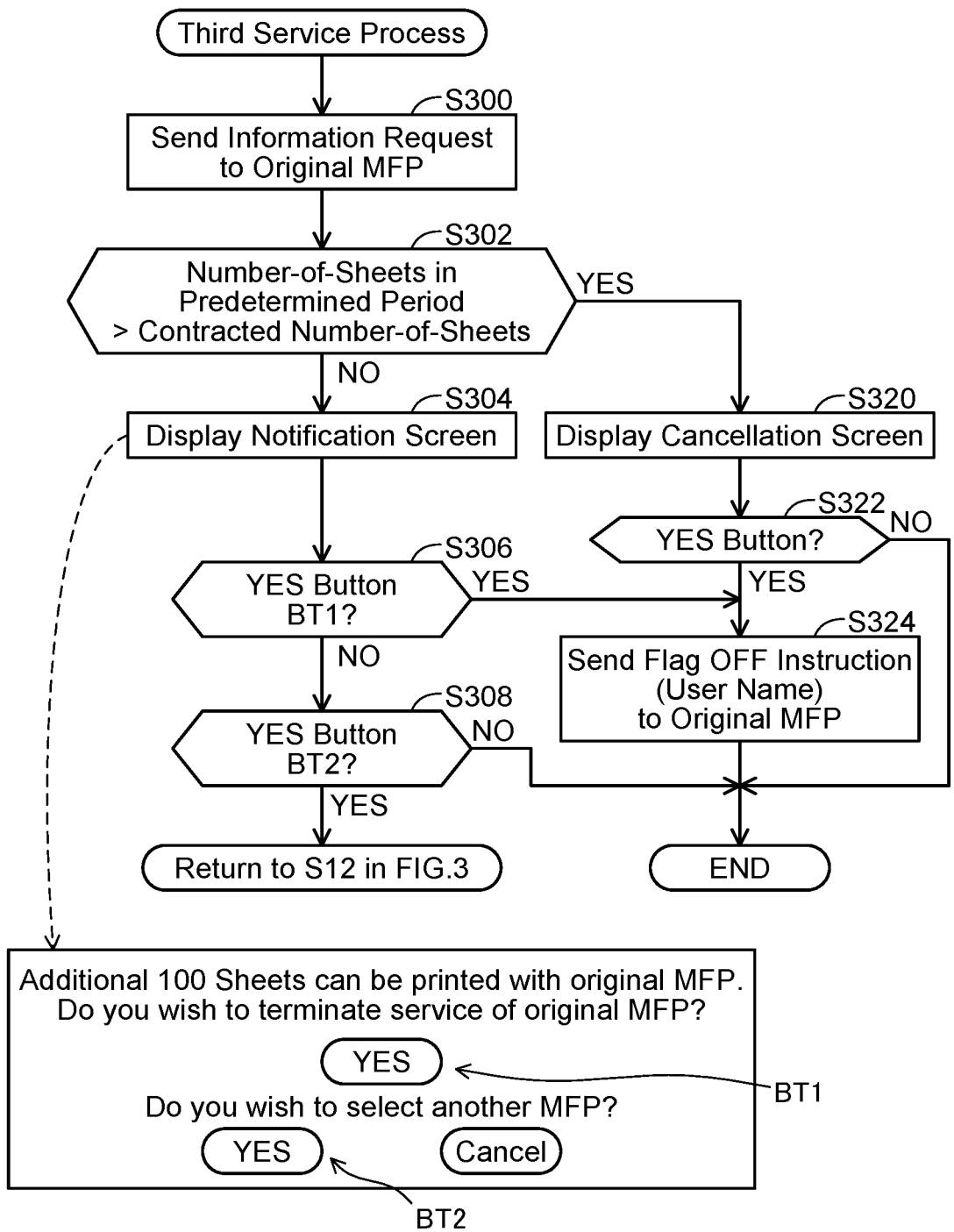
FIG. 7 illustrates a flowchart of a third service process.

With reference to FIG. 7, the third service process in S50 of FIG. 3 will be described. The third service process being performed means that the new MFP 200 is not compatible with the printing service (NO in S20 of FIG. 3).

In S300, the CPU 22 sends an information request to the original MFP 100. The information request is a command for requesting information on whether the specific period number of sheets at the original MFP 100 exceeds the contracted number of sheets. The MFP 100 inquires the SP server 300 about whether the specific period number of sheets exceeds the contracted number of sheets in accordance with the information request, and sends a result of the inquiry to the terminal device 10. In a variant, the CPU 22 may directly inquire the SP server 300 about whether the specific period number of sheets exceeds the contracted number of sheets.

In subsequent S302, the CPU 22 determines whether the inquiry result indicates that the specific period number of sheets exceeds the contracted number of sheets. In a case where the CPU 22 determines that the inquiry result indicates that the specific period number of sheets exceeds the contracted number of sheets (YES in S302), the CPU 22 proceeds to S320. S320 to S324 are the same as S220 to S224 of FIG. 6. Upon completion of S320 to S324, the CPU 22 terminates the process of FIG. 7.

On the other hand, in a case where the CPU 22 determines that the inquiry result indicates that the specific period number of sheets does not exceed the contracted number of sheets (NO in S302), the CPU 22 proceeds to S304. In S304, the CPU 22 causes the display unit 14 to display a notification screen shown in FIG. 7. The notification screen includes a message indicating the content of the inquiry result, a "YES" button BT1 for cancelling the printing service received with the original MFP 100, a "YES" button BT2 for selecting another MFP in the MFP selection screen SC2 (see S12 of FIG. 3), and a "Cancel" button. The user can consider the message in the notification screen and then determine whether he/she continues the contract of the printing service the user is currently receiving with the original MFP 100.

In S306, the CPU 22 determines whether the "YES" button BT1 in the notification screen is selected or not. In a case where the CPU 22 determines that the "YES" button BT1 in the notification screen has been selected (YES in S306), the CPU 22 proceeds to S324. Contrary to this, the CPU 22 determines that the "YES" button BT1 in the notification screen has not been selected (NO in S306), the CPU 22 proceeds to S308.

In S308, the CPU 22 determines whether the "YES" button BT2 in the notification screen is selected or not. In a case where the CPU 22 determines that the "YES" button BT2 in the notification screen has been selected (YES in S308), the CPU 22 returns back to S12 of FIG. 2. On the other hand, in a case where the CPU 22 determines that the "Cancel" button in the notification screen has been selected (NO in S308), the CPU 22 terminates the process of FIG. 7.

For example, there may be a possibility that the user forgets cancelling the printing service the user is receiving with the original MFP 100 while the original MFP 100 is being replaced with the new MFP 200. In this case, payment of the fixed fee remains despite the user being unable to receive the printing service with the new MFP 200. According to the third service process of FIG. 7, in a case where the new MFP 200 is not compatible with the supply of the printing service (NO in S20 of FIG. 3), the terminal device 10 sends the flag OFF instruction to the original MFP 100 (S324 of FIG. 7). This allows the printing service being received with the original MFP 100 to be cancelled. The user can be prevented from forgetting to cancel the printing service with the original MFP 100.

(Fourth Service Process; FIG. 8)

Figure 8:
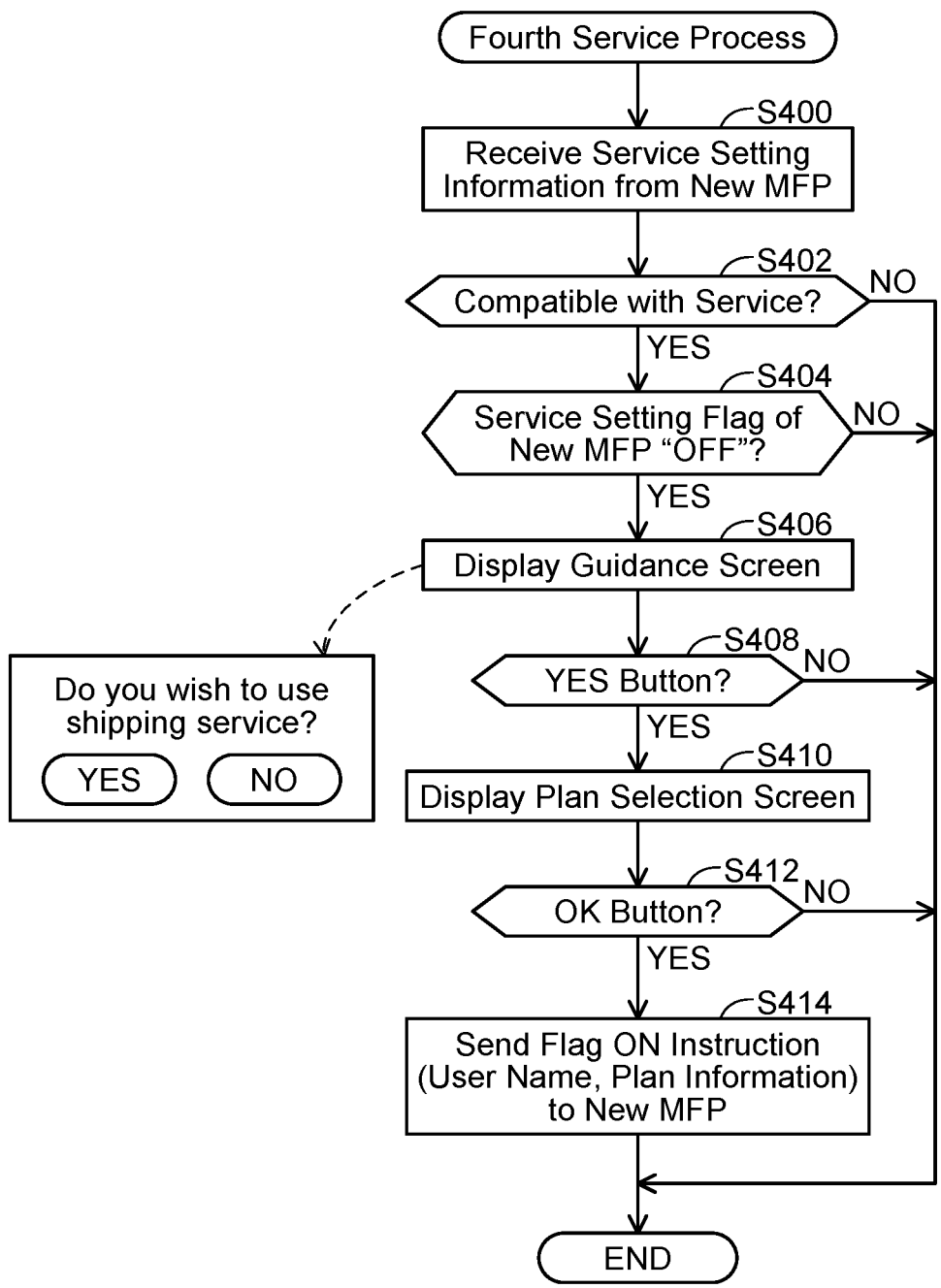
FIG. 8 illustrates a flowchart of a fourth service process.

With reference to FIG. 8, the fourth service process in S60 of FIG. 3 will be described. The fourth service process being performed means that the user is not currently receiving the printing service with the original MFP 100 (NO in S16 of FIG. 3).

S400, S402 are the same as S18, S20 in FIG. 3. In a case where the CPU 22 determines that the new MFP 200 is compatible with the supply of the printing service (YES in S402), the CPU 22 proceeds to S404.

S404 is the same as S22 of FIG. 3. In a case where the CPU 22 determines that the service setting flag in the service setting information indicates "OFF" (YES in S404), the CPU 22 proceeds to S406. In S406, the CPU 22 causes the display unit 14 to display a guide screen. The guide screen includes a message guiding that the printing service (i.e. shipping service) is available (e.g., "Do you wish to use shipping service?"), and "YES" and "NO" buttons. This allows to encourage the user to receive the shipping service in a situation where the user is not currently receiving the shipping service with the original MFP 100.

In subsequent S408, the CPU 22 determines whether the "YES" button in the guide screen is selected or not. In a case where the CPU 22 determines that the "YES" button in the guide screen has been selected (YES in S408), the CPU 22 proceeds to S410 to S414. S410 to S414 are the same as S110 to S114 except that the process of FIG. 8 is terminated in the case where the "Cancel" button in the plan selection screen is selected in S412, and that the serial number SN2 of the new MFP 200 is newly stored in the device table 334 in response to the sending of the flag ON instruction (see FIG. 2).

Further, in a case where the CPU 22 determines that the new MFP 200 is not compatible with the supply of the printing service (NO in S402), and the "NO" button in the guide screen has been selected (NO in S408), the CPU 22 terminates the process of FIG. 8.

(Corresponding Relationship)

The terminal device 10, the communication I/F 12, and the display unit 14 are examples of "terminal device", "communication interface", and "display unit", respectively. The original MFP 100 and the serial number SN1 are examples of "specific device" and "specific identification information", respectively. The new MFP 200 and the serial number SN2 are examples of "target device" and "target identification information", respectively. The SP server 300 and the memory 324 are examples of "server" and "memory", respectively. The color CTG(s) is an example of "consumable article". Each information in the user table 332 is an example of "service information". The shipping address information DI and the plan information "plan 1" are examples of "shipping address information" and "content information".

The service setting information in S18 of FIG. 3 is an example of "compatibility information". The process in S106 of FIG. 4 is an example of "first changing process". The flag ON instruction in S106 is an example of "sending request". The plan selection screen in S110 of FIG. 4 is an example of "second selection screen". The process in S114 of FIG. 4 is an example of "consumable article changing process". The MFP selection screen SC2 of FIG. 5 is an example of "first selection screen". The second service process of FIG. 6 is an example of "second changing process". The third service process of FIG. 7 is an example of "third changing process". The guide screen in S406 of FIG. 8 is an example of "instruction screen".

S10 and S30 of FIG. 3 are an example of "search for one or more devices in the network via the communication interface" and "execute a first changing process for changing a state of a memory configured capable of storing service information in association with identification information identifying a device".

(Variant 1) The "device" is not limited to a MFP, but for example may be a printer having only a print function, a scanner having only a scan function, a facsimile device, a personal computer (PC), etc. When the "device" is a scanner, the "consumable article" may be a specific component in the scanner, for example.

(Variant 2) The "memory" is not limited to the memory 324 of the SP server 300, but may be the memory 124 of the terminal device 10, for example. In this case, the memory 124 may store the tables 332, 334, for example.

(Variant 3) The "consumable article" is not limited to the color CTG(s), but may be a print medium, for example.

(Variant 4) "Specific condition" is not limited to the remaining amount being at or less than a threshold, but may be a number of sheets printed during the specific period being a specific number or more, and/or an operating time for which the MFP 100 operates in a specific period is a specific time or longer.

(Variant 5) The process in S12 of FIG. 3 may not be performed. In the present variant, the terminal device 10 may automatically select a target MFP. In the present embodiment, the "first selection screen" may be omitted.

(Variant 6) In S106 of FIG. 4, the terminal device 10 causes the MFP 200 to send the serial number SN2 to the SP server 300 by sending the flag ON instruction to the MFP 200. Instead of this, the terminal device 10 may receive the serial number SN2 from the MFP 200, and send the serial number SN2 to the SP server 300. In the present variant, the "sending request" may be omitted, and the sending of the serial number SN2 to the SP server 300 is an example of the "first changing process".

(Variant 7) The processes in S104, S114 of FIG. 4 may not be performed. In the present variant, "determine whether a target consumable article used by the target device is identical to a specific consumable article used by the specific device", and "a consumable article changing process".

(Variant 8) The process in S110 of FIG. 4 may not be performed. In the present embodiment, the "second selection screen" may be omitted.

(Variant 9) The determination in S22 of FIG. 3 may not be performed. In the present variant, "determine whether target service information is stored in the memory in association with the target identification information" may be omitted.

(Variant 10) The process in S40 of FIG. 3 (that is, the second service process in FIG. 6) may not be performed. In the present variant, the "second changing process" may be omitted.

(Variant 11) The processes in S18, S20, S50 of FIG. 3 (that is, the third service process in FIG. 7) may not be performed. In the present variant, the "compatibility information" and "the third changing process" may be omitted.

(Variant 12) The processes in S16, S60 of FIG. 3 (that is, fourth service process in FIG. 8) may not be performed. In the present variant, the "instruction screen" may be omitted.

(Variant 13) In S60 of FIG. 3, the third service process may be performed instead of the fourth service process. That is, the processes of S300 to S308 in FIG. 7 may not be performed. Also, in S50 of FIG. 3, the fourth service process may be performed instead of the third service process.

(Variant 14) In each of the above-described embodiments, each process of FIGS. 2 to 8 is realized by software (e.g., programs 30, 32), however, at least one of those processes may be realized by hardware such as logic circuit.

What is claimed is:

1. A non-transitory computer-readable medium storing computer-readable instructions for a terminal device, wherein
the terminal device comprises a communication interface configured for communication via a network and a processor,
wherein the computer-readable instructions, when executed by the processor, cause the terminal device to:
search for one or more devices in the network via the communication interface; and
execute a first changing process for changing a state of a memory configured capable of storing service information in association with identification information identifying a device, wherein
the service information is information for providing a shipping service,
the shipping service is a service for shipping a consumable article to be used by the device to a user of the device in a case where an operating state of the device satisfies a specific condition,
the first changing process includes a process for, in a situation where the memory stores specific service information in association with specific identification information identifying a specific device, storing the specific service information in association with target identification information in place of the specific identification information,
the specific device is a device indicated by device information currently registered in the terminal device, and
the target identification information is information identifying a target device from among the searched one or more devices.

2. The non-transitory computer-readable medium as in claim 1, wherein
the terminal device further comprises a display unit, and
the computer-readable instructions, when executed by the processor, further cause the terminal device to:
after the one or more devices have been searched for, cause the display unit to display a first selection screen for selecting the target device from among the one or more devices.

3. The non-transitory computer-readable medium as in claim 1, wherein
the service information includes shipping address information indicating a shipping address of the consumable article and content information indicating a content of the shipping service.

4. The non-transitory computer-readable medium as in claim 1, wherein
a server provided separately from the terminal device comprises the memory, and
the first changing process includes a communication for sending the target identification information to the server.

5. The non-transitory computer-readable medium as in claim 4, wherein
the communication includes sending, via the communication interface, a sending request requesting the target identification information to be sent to the target device, and
the target device sends the target identification information to the server in response to receiving the sending request from the terminal device.

6. The non-transitory computer-readable medium as in claim 1, wherein
the computer-readable instructions, when executed by the processor, further cause the terminal device to:
determine whether a target consumable article used by the target device is identical to a specific consumable article used by the specific device, wherein
in a case where it is determined that the target consumable article is not identical to the specific consumable article, the first changing process includes a consumable article changing process for changing information indicating the specific consumable article in the specific service information to information indicating the target consumable article, and
in a case where it is determined that the target consumable article is identical to the specific consumable article, the first changing process does not include the consumable article changing process.

7. The non-transitory computer-readable medium as in claim 6, wherein
it is determined that the target consumable article is identical to the specific consumable article in a case where at least a part of information identifying the target consumable article is identical to at least a part of information identifying the specific consumable article.

8. The non-transitory computer-readable medium as in claim 6, wherein
the terminal device further comprises a display unit, and
the computer-readable instructions, when executed by the processor, further cause the terminal device to:
in a case where the target consumable article is not identical to the specific consumable article, cause the display unit to display a second selection screen for selecting whether or not to execute the consumable article changing process,
the first changing process including the consumable article changing process is executed in a case where it is selected in the second selection screen to execute the consumable article changing process, and
the first changing process is not executed in a case where it is selected in the second selection screen not to execute the consumable article changing process.

9. The non-transitory computer-readable medium as in claim 1, wherein
the computer-readable instructions, when executed by the processor, further cause the terminal device to:
determine whether target service information is stored in the memory in association with the target identification information,
in a case where it is determined that the target service information is not stored in the memory in association with the target identification information, execute the first changing process, wherein in a case where it is determined that the target service information is stored in the memory in association with the target identification information, the first changing process is not executed.

10. The non-transitory computer-readable medium as in claim 9, wherein
the computer-readable instructions, when executed by the processor, further cause the terminal device to:
in the case where it is determined that the target service information is stored in the memory in association with the target identification information, change a state of the memory from a state in which supply of the shipping service using the specific service information is enabled to a state in which the supply of the shipping service using the specific service information is disabled.

11. The non-transitory computer-readable medium as in claim 1, wherein
the computer-readable instructions, when executed by the processor, further cause the terminal device to:
receive, from the target device via the communication interface, compatibility information indicating whether the target device is compatible with supply of the shipping service; and
in a case where the received compatibility information indicates that the target device is not compatible with the supply of the shipping service, change a state of the memory from a state in which the supply of the shipping service using the specific service information is enabled to a state in which the supply of the shipping service using the specific service information is disabled, and
in a case where the received compatibility information indicates that the target device is compatible with the supply of the shipping service, execute the first changing process.

12. The non-transitory computer-readable medium as in claim 1, wherein
the terminal device further comprises a display unit,
the first changing process is executed in a case where the specific service information is stored in association with the specific identification information in the memory, and
the computer-readable instructions, when executed by the processor, further cause the terminal device to:
in a case where the specific service information is not stored in association with the specific identification information in the memory, cause the display unit to display an instruction screen for receiving an instruction to store target service information in association with the target identification information in the memory.

13. A method comprising:
a step for searching for one or more devices in the network via a communication interface of a terminal device; and
a step for executing a first changing process for changing a state of a memory configured capable of storing service information in association with identification information identifying a device, wherein
the service information is information for providing a shipping service,
the shipping service is a service for shipping a consumable article to be used by the device to a user of the device in a case where an operating state of the device satisfies a specific condition,
the first changing process includes a process for, in a situation where the memory stores specific service information in association with specific identification information identifying a specific device, storing the specific service information in association with target identification information in place of the specific identification information,
the specific device is a device indicated by device information currently registered in the terminal device, and
the target identification information is information identifying a target device from among the searched one or more devices.

14. The method as in claim 13, further comprising:
after the one or more devices have been searched for, a step for causing a display unit of the terminal device to display a first selection screen for selecting the target device from among the one or more devices.

15. The method as in claim 13, wherein
the service information includes shipping address information indicating a shipping address of the consumable article and content information indicating a content of the shipping service.

16. The method as in claim 13, wherein
a server provided separately from the terminal device comprises the memory, and
the first changing process includes a communication for sending the target identification information to the server.

17. The method as in claim 16, wherein
the communication includes sending, via the communication interface, a sending request requesting the target identification information to be sent to the target device, and
the target device sends the target identification information to the server in response to receiving the sending request from the terminal device.

18. The method as in claim 13, further comprising:
a step for determining whether a target consumable article used by the target device is identical to a specific consumable article used by the specific device, wherein
in a case where it is determined that the target consumable article is not identical to the specific consumable article, the first changing process includes a consumable article changing process for changing information indicating the specific consumable article in the specific service information to information indicating the target consumable article, and
in a case where it is determined that the target consumable article is identical to the specific consumable article, the first changing process does not include the consumable article changing process.

19. A terminal device comprising:
a communication interface configured for communication via a network; and
a controller configured to:
search for one or more devices in the network via the communication interface; and
execute a first changing process for changing a state of a memory configured capable of storing service information in association with identification information identifying a device, wherein
the service information is information for providing a shipping service,
the shipping service is a service for shipping a consumable article to be used by the device to a user of the device in a case where an operating state of the device satisfies a specific condition,
the first changing process includes a process for, in a situation where the memory stores specific service information in association with specific identification information identifying a specific device, storing the specific service information in association with target identification information in place of the specific identification information, the specific device is a device indicated by device information currently registered in the terminal device, and the target identification information is information identifying a target device from among the searched one or more devices.

* * * * *